US008761660B2

(12) United States Patent
Libin et al.

(10) Patent No.: US 8,761,660 B2
(45) Date of Patent: Jun. 24, 2014

(54) USING INTELLIGENT SCREEN COVER IN LEARNING

(75) Inventors: Phil Libin, San Jose, CA (US); Andrew Sinkov, San Francisco, CA (US)

(73) Assignee: Evernote Corporation, Redwood City, CA (US)

( * ) Notice: Subject to any disclaimer, the term of this patent is extended or adjusted under 35 U.S.C. 154(b) by 110 days.

(21) Appl. No.: 13/471,686

(22) Filed: May 15, 2012

(65) Prior Publication Data

US 2012/0308981 A1 Dec. 6, 2012

Related U.S. Application Data

(60) Provisional application No. 61/493,697, filed on Jun. 6, 2011.

(51) Int. Cl.
*G09B 5/02* (2006.01)
(52) U.S. Cl.
CPC ........................................ *G09B 5/02* (2013.01)
USPC .......................................................... 434/362
(58) Field of Classification Search
CPC ............ G09B 5/02; G09B 5/06; G09B 5/065; G09B 5/14
USPC .................................. 434/347, 348, 362, 364
See application file for complete search history.

(56) References Cited

U.S. PATENT DOCUMENTS

| | | | |
|---|---|---|---|
| 4,005,535 A | 2/1977 | Davis | |
| 5,334,021 A * | 8/1994 | Kahn | ............................ 434/348 |
| 5,618,180 A * | 4/1997 | Nathanson | ..................... 434/156 |
| 6,053,741 A | 4/2000 | Wood | |
| D658,188 S * | 4/2012 | Diebel | .......................... D14/440 |
| 8,264,310 B2 * | 9/2012 | Lauder et al. | .................. 335/219 |
| 8,395,465 B2 * | 3/2013 | Lauder et al. | .................. 335/219 |
| 8,442,423 B1 * | 5/2013 | Ryan et al. | ..................... 434/362 |
| 8,465,355 B1 * | 6/2013 | Liang | ................................. 463/9 |
| 2006/0154225 A1 * | 7/2006 | Kim | ............................... 434/322 |
| 2006/0284852 A1 | 12/2006 | Hofmeister et al. | |

(Continued)

OTHER PUBLICATIONS

Alexander Mokrushin, "Geo Map Quiz for iPad", Oct. 29, 2010, iTunes <https://itunes.apple.com/us/app/geo-map-quiz-for-ipad/id397996162?mt=8>.*

(Continued)

*Primary Examiner* — Sam Yao
*Assistant Examiner* — Michael Humphrey
(74) *Attorney, Agent, or Firm* — Muirhead and Saturnelli, LLC

(57) ABSTRACT

A computer learning system includes a computer screen, a cover that selectively covers and reveals different amounts of the computer screen and a computer processor that senses an amount of the computer screen that is revealed by the cover. The processor causes a first learning segment to be displayed on the computer screen in response to the cover revealing a first portion of the computer screen and causes a second learning segment to be displayed on the computer screen in response to the cover revealing a second portion of the computer screen. The first learning segment may be a question and the second learning segment may be an answer to the question. The computer processor and the computer screen may be provided by a tablet computer. The table computer may be an iPad® 2 tablet computer.

14 Claims, 11 Drawing Sheets

(56) References Cited

U.S. PATENT DOCUMENTS

| | | | |
|---|---|---|---|
| 2009/0027583 A1 | 1/2009 | McBroom et al. | |
| 2009/0075247 A1 | 3/2009 | Tucci | |
| 2010/0091442 A1 | 4/2010 | Theobald et al. | |
| 2011/0111793 A1 | 5/2011 | White | |
| 2011/0275050 A1* | 11/2011 | Tucci | 434/362 |
| 2012/0068798 A1 | 3/2012 | Lauder et al. | |
| 2012/0270200 A1* | 10/2012 | Stearns | 434/322 |
| 2013/0040273 A1* | 2/2013 | Rath et al. | 434/262 |

OTHER PUBLICATIONS

"Apple Launches iPad 2", In: Apple Press Info. Dated Mar. 2, 2011, Retrieved on Aug. 10, 2012, Retrieved from the internet at URL: http://www.appie.com/pr/library/2011/03/02Apple-Launches-iPad-2.html.

Graham, Flora, "Apple iPad 2 Smart Cover Review." cnet reviews, Dated Mar. 25, 2011, Retrieved on Aug. 15, 2012, retrieved from the Internet at URL: http://reviews.cnet.co.uk/misc/apple-ipad-2-smart-cover-review-50003294/.

* cited by examiner

USING INTELLIGENT SCREEN COVER IN LEARNING

RELATED APPLICATIONS

This application claims priority to U.S. Prov. App. No. 61/493,697, filed Jun. 6, 2011, and entitled "Computer Game," which is incorporated herein by reference.

TECHNICAL FIELD

This application is directed to the field of human-computer interaction and presenting sequential information through such interaction, particularly in connection with computer-aided learning and training conducted on portable computers, supplied with sensor-equipped or simulated screen cover.

BACKGROUND OF THE INVENTION

Learning applications exist that benefit from presenting knowledge in the "question and answer" (Q&A) format. A widespread example of such an application is a quiz where recalling answers and comparing them with correct answers helps users learn a particular knowledge area.

Modern portable computers, such as tablets, have sufficiently large, bright, high resolution screens and full-screen multi-touch navigation and control capabilities, which make them convenient mobile devices for learning purpose. Additionally, advanced screen protectors, for example, Smart Cover for iPad® 2 tablet computer and subsequent models of the same and other tablets, designed by Apple Computer and other hardware companies, reliably safeguard tablet screens and can be used as replacements of on-off buttons, suspending device when the cover is closed and resuming it when the cover is re-opened.

Accordingly, it would be desirable to provide the Q&A and/or task solving format that take advantage of advanced tablet features, including intelligent screen protectors.

SUMMARY OF THE INVENTION

According to the system described herein, a computer learning system includes a computer screen, a cover that selectively covers and reveals different amounts of the computer screen and a computer processor that senses an amount of the computer screen that is revealed by the cover. The processor causes a first learning segment to be displayed on the computer screen in response to the cover revealing a first portion of the computer screen and causes a second learning segment to be displayed on the computer screen in response to the cover revealing a second portion of the computer screen. The first learning segment may be a question and the second learning segment may be an answer to the question. In response to the cover revealing a third portion of the computer screen, the computer processor may cause a score to be displayed on the computer screen. The first portion of the computer screen may be a subset of the second portion of the computer screen and the second portion of the computer screen may be a subset of the third portion of the computer screen. The computer processor and the computer screen may be provided by a tablet computer. The table computer may be an iPad® 2 tablet computer. The cover may be a magnetic cover having an edge that includes at least one magnet. A location of the edge of the cover may be determined by detecting the at least one magnet. The cover may be implemented using software. A location of an edge of the cover may be determined based on user touch gestures on the computer screen.

According further to the system described herein, providing automated learning includes sensing an amount of a computer screen that is revealed by a cover that is placed on the computer screen, causing a first learning segment to be displayed on the computer screen in response to the cover revealing a first portion of the computer screen, and causing a second learning segment to be displayed on the computer screen in response to the cover revealing a second portion of the computer screen. The first learning segment may be a question and the second learning segment may be an answer to the question. Providing automated learning may also include causing a score to be displayed on the computer screen in response to the cover revealing a third portion of the computer screen. The first portion of the computer screen may be a subset of the second portion of the computer screen and the second portion of the computer screen may be a subset of the third portion of the computer screen. The cover may be implemented using software.

According further to the system described herein, computer software, provided in a non-transitory computer-readable medium, provides automated learning. The software includes executable code that senses an amount of a computer screen that is revealed by a cover that is placed on the computer screen, executable code that causes a first learning segment to be displayed on the computer screen in response to the cover revealing a first portion of the computer screen, and executable code that causes a second learning segment to be displayed on the computer screen in response to the cover revealing a second portion of the computer screen. The first learning segment may be a question and the second learning segment may be an answer to the question. The software may also include executable code that causes a score to be displayed on the computer screen in response to the cover revealing a third portion of the computer screen. The first portion of the computer screen may be a subset of the second portion of the computer screen and the second portion of the computer screen may be a subset of the third portion of the computer screen. A location of an edge of the cover may be determined based on user touch gestures on the computer screen.

A Q&A, task solving or other learning application runs on a computer equipped with a physical or a software simulated (virtual) screen cover. The application may detect when a user opens and closes the cover and employs this information as a User Interface (UI) Input. In one embodiment, the user may peek under a physical cover and see a question (a clue). When the user peeks under the cover (slightly opens the cover or opens one section of a multi-section cover), the system generates a new Q&A entry and displays it on the screen, along with a score line. Initially, a user may only see a question (not an answer) when peaking under the cover (i.e. lifting portion of the cover). In another embodiment, a user may shift a portion of a simulated cover using haptic input, a gesture, such as a "swipe" multi-touch gesture "retracting" the virtual cover. When the system detects the gesture, the system generates a new Q&A entry and removes a portion of the simulated cover to display the clue.

The user can open the cover further, thus progressively revealing additional information. In one embodiment, such additional information includes an answer to the question and the score. The user may check if the anticipated answer coincides with a guessed answer and respectively modify the score of a Q&A entry declaring the answer correct or wrong. In other embodiments, additional information may include evolving task conditions, accompanying information, multi-user environment, moderated score assignment, etc.

After finishing with a Q&A entry, the user closes the cover. Closing the cover may be detected by the system which, in response thereto, provides a signal that causes the system to place a most recent entry into the list of processed items so that the most recent entry is not repeated during a current learning session. In one embodiment, Q&A entries are generated in a random order where the next entry is selected from the list of yet unused entries. The sequence of answers by a user may be different in different learning sessions. In another embodiment, Q&A entries may be offered each time in the same order and the sequence of answers by a user may be constant for each learning session. In yet another embodiment, repetitive display of Q&A entries may be allowed. Different embodiments may be combined as different options in one software application.

In one embodiment of the system described herein, Q&A entries can be grouped into "notebooks" or "questionnaires" by topics or other characteristics. A notebook may be selected by a user prior to answering questions. In yet another embodiment of the system, a physical or a simulated screen cover may detect multiple stages of opening by a user, section-by-section, and the system may detect such multiple states and behave accordingly by revealing, for example, multiple conditions of a task or displaying accompanying information to facilitate answering a question.

According further to the system described herein, a non-transitory computer readable medium that stores software implements a Q&A or task solving learning application. The software may run on a computer that uses a physical or a software simulated (virtual) cover.

The software may include executable code that detect when a user opens and closes the cover and uses the information as a User Interface (UI) Input. In one embodiment, the user may peek under a physical cover and see a question (a clue). The software may include executable code which, when a user slightly opens the cover (opens one section of the cover) and peeks under the cover, generates a new Q&A entry and displays the new entry on the screen, along with a score line, so that a user can only see a question (but not a corresponding answer) when peaking under the cover. In another embodiment, the software may include executable code which interacts with a user allowing shifting a portion of the simulated cover using haptic input, so that user may see the clue. An example of such haptic input is a "swipe" multi-touch gesture "retracting" the simulated cover. When executable code within the software detects a swipe gesture, the code may generate a new Q&A entry and redraw a virtual cover with a removed portion (section) to display the clue in place of the portion of the cover.

The user may open the cover more to progressively reveal more information. In one embodiment, additional information includes an answer and the score. The user may check if the anticipated answer coincides with a true answer. The software may include executable code allowing the user to further retract the virtual cover and modify the score of a Q&A entry. In other embodiments, executable code may be included in the software that displays additional information, following multi-section opening of physical or emulated cover, such as evolving task conditions, accompanying information, etc.

After finishing with one Q&A entry, the user may close the cover. The software may include executable code that detects such interaction and puts the Q&A entry into the list of processed items, so that the entry may not be repeated during the learning session. In one embodiment, the executable code may generate Q&A entries in a random order where the next entry is selected from the list of yet unused entries. The sequence of answers by a user may be different in different learning sessions. In another embodiment, the executable code may offer Q&A entries each time in the same order and the sequence of answers by a user is the same for each learning session. In yet another embodiment, the executable code included in the software may allow repetitive display of Q&A entries. The software may include executable code allowing different embodiments to be present as different options in one software application.

In another embodiment of the system described herein, Q&A entries may be grouped into "notebooks" or "questionnaires" by topics or other characteristics. The software may include executable code to allow a user select a book prior to answering questions. In yet another embodiment of the system, a physical or simulated screen cover may detect multiple stages of opening by a user, section-by-section, and the software may include executable code that detects such multiple states and behaves accordingly by revealing, as an example, multiple conditions of a task or displaying accompanying information to facilitate answering a question.

BRIEF DESCRIPTION OF THE DRAWINGS

Embodiments of the system described herein will now be explained in more detail in accordance with the figures of the drawings, which are briefly explained as follows.

DETAILED DESCRIPTION OF VARIOUS EMBODIMENTS

Figure 1C:
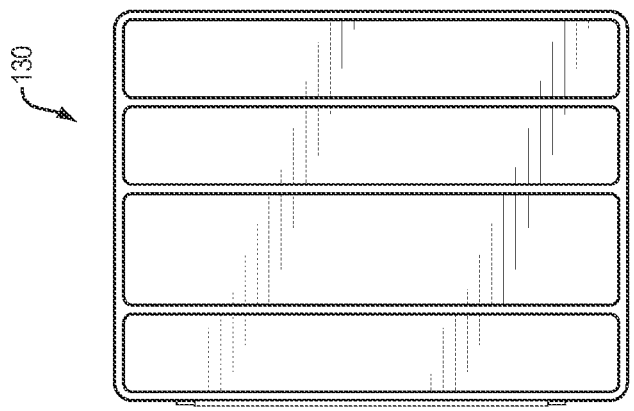
FIGS. 1A-1C illustrate different phases of operation according to an embodiment of the system described herein.

The system described herein provides a mechanism for user learning on portable computers with physical or emulated intelligent screen cover. The ability of a computer to identify the disposition of cover relative to the screen (open, closed, intermediate) gives the system the capacity to unveil information progressively as a user lifts the cover and gets an increasingly broad view of the screen. Such an ability may be implemented using different mechanisms: magnetic, optical, haptic and other sensors, which can measure the presence of contact of edges of a cover with edges of the device via embedded magnets; brightness or illumination of the screen; touch gestures on a multi-touch screen (simulated cover); etc. Although the system described herein is illustrated using a tablet computer having an integrated screen and processor, the system may be implemented using any appropriate computer processor coupled to a screen.

In some embodiments, the cover is divided into sections that can be progressively lifted as user explores learning material. Each screen display of the system represents one or more learning segments such as a Q&A entry or a task segmented and visualized in accordance with the geometry of physical or emulated cover. By opening the first section of a closed cover, a user causes the computer to generate a new learning segment (task or Q&A entry), and then user "peeks" into the learning segment. In some cases, the first section covers a question or a set of initial conditions of a task. After reading the question or conditions and contemplating an answer, the user opens the next section which has an answer or solution to the task (or additional information related to question or conditions). If the user anticipated the correct answer or solution of the task and is interested in keeping a total score, the score for the current Q&A entry is set as "correct" and the overall score of the Q&A or task set may be increased in favor of the user. A learning segment includes text, picture(s), sound, a combination of two or more of text, picture(s), and sound, and/or any other computer output that conveys information to a user.

In one embodiment, a right answer is assumed by default and the user has to change the score only in case of failure. In some embodiments, the user may record or otherwise communicate an answer to a Q&A entry or a solution to the task, which is then checked by scorekeeper such as a teacher, supervisor, contest judge, audience, or other participant; with such embodiment assuming multi-user access to the learning session, the user uncovers the answer portion of the screen merely for self-checking purpose or as a means to communicate the answer in a distributed environment where other participants may not know it. The system described herein is intended for developing both individual and collective learning applications that may benefit from sequential presentation of information using intelligent screen covers.

In one embodiment, a user chooses a set of Q&A entries, each of which may be implemented as an Evernote notebook provided by Evernote Corporation of Mountain View, Calif. The user closes the screen cover (iPad® 2 tablet computer's Smart Cover or emulated on-screen cover) and then peeks in to begin. The question of the first Q&A entry is then displayed under the opened portion of the cover. A user guesses the answer and opens the next flap of the cover where the answer (and, possibly, an image illustrating the answer) is shown, with a score line for an individual item above it. The default score value is "correct" so that in the case of a wrong answer, users who are interested in keeping adequate score may check an "incorrect" box. The overall score for the notebook may be instantly updated and permanently displayed in the top portion of the screen. In order to view total score, a user may open a next section of the screen cover.

The mapping of notes of an Evernote notebook onto Q&A entries may be provided as follows: the note title is mapped as a question (a clue) and text in the body of the note is truncated to fit display area of the answer (in one embodiment, text is truncated to the first three hundred characters). If the body of the note includes text and images, the first image may be displayed as an "illustration" to the answer in the right column of the answer area. If the body includes only image(s), the first image is optimized to best fit the size of the answer area and displayed there.

According to the system described herein, three phases, "peek", "open more", and "close" are repeated by a user for each Q&A entry in the notebook. Such learning session may be continued until notebook items are exhausted or until the user has interrupted the session. The order of displaying Q&A entries to a user may be different depending on the goals of learning session. In one embodiment, items may be presented during a learning session in a random non-repetitive order. In another embodiment, aimed at more structured learning, the order of items may be fixed and does not change from one learning session to another when the same Q&A set (notebook) is used. In some embodiments, repetition of a previously encountered item in the same session of Q&A entries is permitted, irrespective of whether the items are presented in fixed or random order. The diverse methods of presenting individual Q&A entries may be employed as options of a software application or another implementation method. Accordingly, the methods of presentation may be altered by a user with respect to a whole process of user interaction with the system or for a particular notebook. Additionally, in one embodiment, a user may search in the questions and answer items in order to enable user-defined sequence of items within a learning session.

Figure 1B:
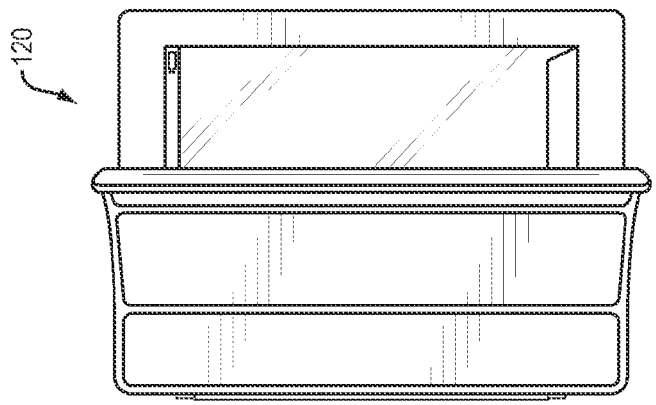
Figure 1A:
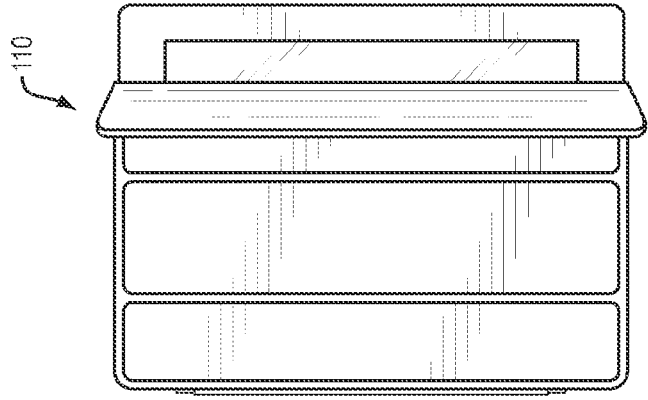

FIGS. 1A-1C illustrate three stages of processing of an individual Q&A entry. At a first stage 110, a user partially opens the cover and peeks under it. The system detects this change of status of the cover (from a closed state) and interprets the change as a UI input, instantly generating a first/next Q&A entry and displaying a portion thereof (i.e., a question) on the screen. In an embodiment herein, the cover may be closed (i.e., completely covering the screen) prior to the stage 110.

Depending on options possibly set by the user, the question may be from a random entry, a random entry among remaining entries not yet presented to a user, a first/next entry in the fixed order (either pre-established for the set of entries or defined by a user), or an entry selected using a different criteria. The entry may be instantly displayed on the screen and an initial portion of the entry, such as a question, task conditions, etc. may be visible to the user on a portion of the screen that is not covered.

At a second stage 120, the user opens the cover further, in one or several incremental steps, and can see additional screen contents, including an answer (or task solution), score line, overall score, and such other information that the entry may contain. A user interested in keeping score may update the score line for the current entry depending on whether the user answered the question (or solved the task) correctly or not. Upon completion of viewing and acting on the current entry, the user proceeds to a stage 130 and closes the cover. The system detects the change of condition and prepares to generate and present the next entry. For example, if an order for the current learning session is non-repetitive display of Q&A entries, then the system may delete a latest processed entry from the list of unused entries. A cycle illustrated by the phases 110, 120, 130 may be repeated for each entry.

Figure 2A:
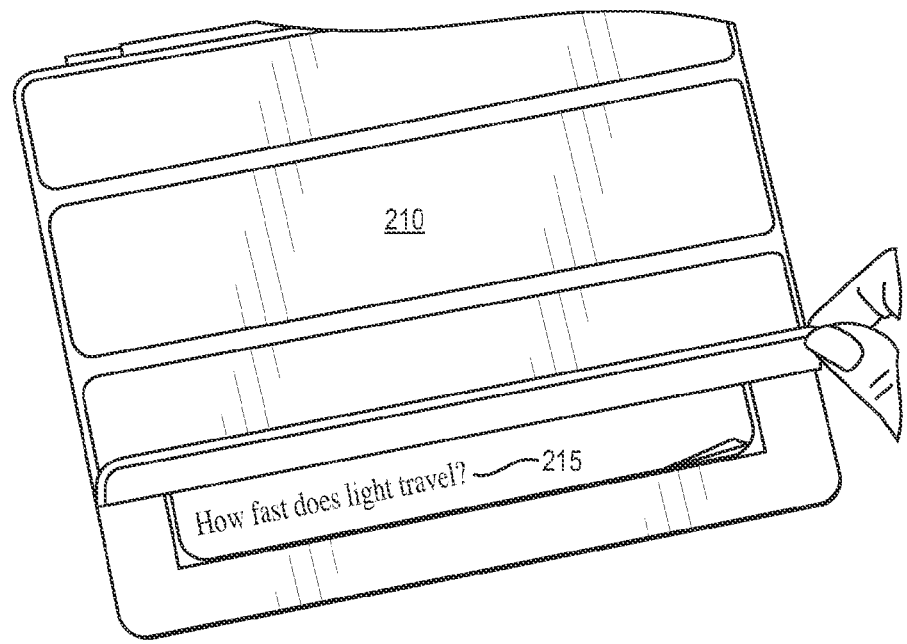
FIGS. 2A-2D illustrate using a physical screen cover according to an embodiment of the system described herein.

FIGS. 2A-2D illustrate in more detail use of the system described herein. FIG. 2A shows a physical intelligent screen cover 210, such as an iPad® 2 tablet computer Smart Cover provided by Apple Computer. A user lifts a bottom section of the cover 210 and sees a question 215 displayed on the screen. The user may then attempt to guess the answer to the question (to himself or out loud). Of course, there is no requirement that the user attempt to answer the question and the user may simply choose to read the question.

Figure 2B:
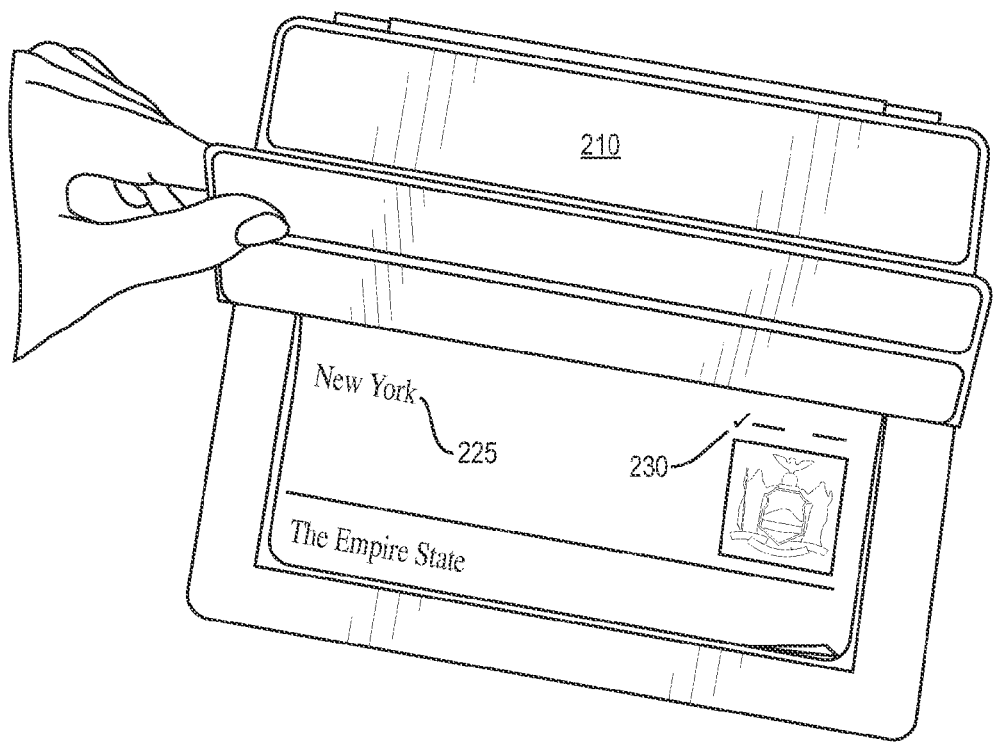

FIG. 2B shows that following reviewing (and possibly answering) the question, the user lifts a next section of the cover 210, to see an answer 225. Users interested in keeping score of the learning game may access and change a scoring portion 230, as appropriate. For example, if a user guessed the wrong answer, a score option labeled "incorrect" may be checked.

Figure 2C:
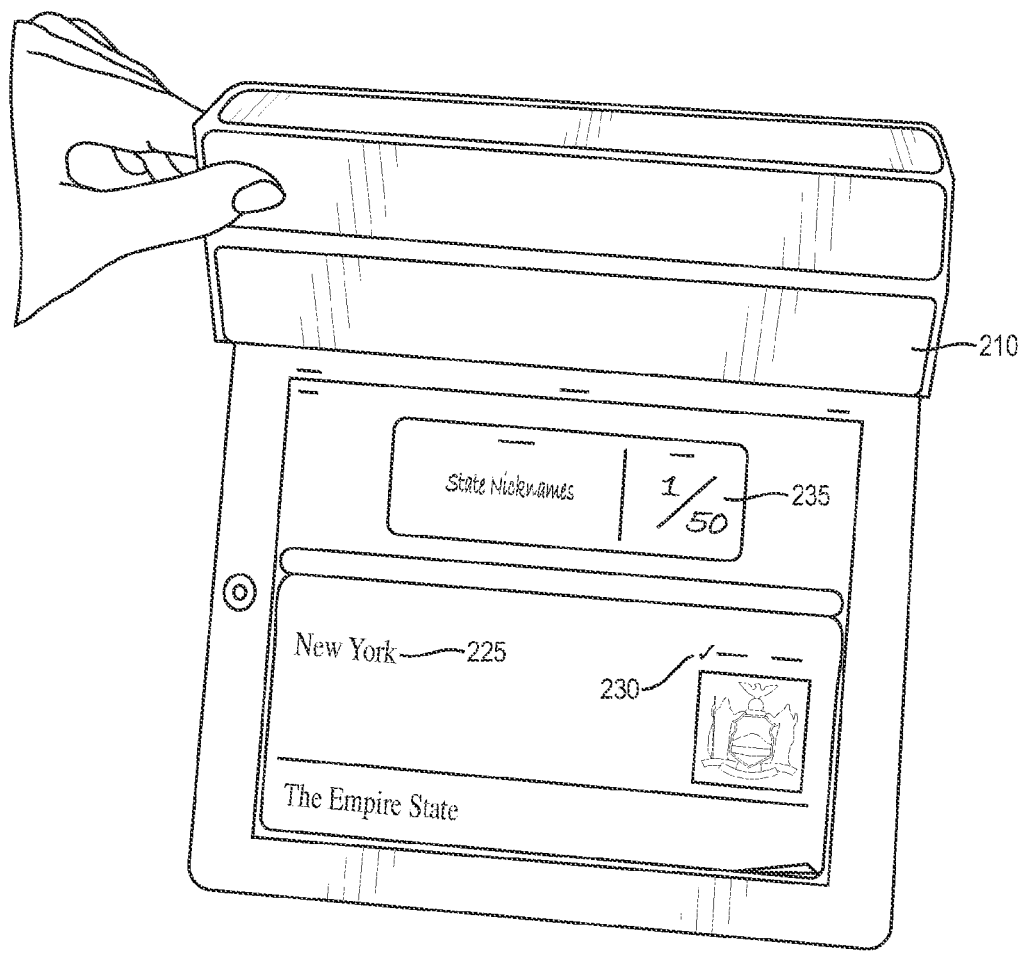

FIG. 2C illustrates that by opening screen cover further, the user gains access to a top portion of the screen where additional information may be displayed, such as a total score portion 235 of a current learning session.

Figure 2D:
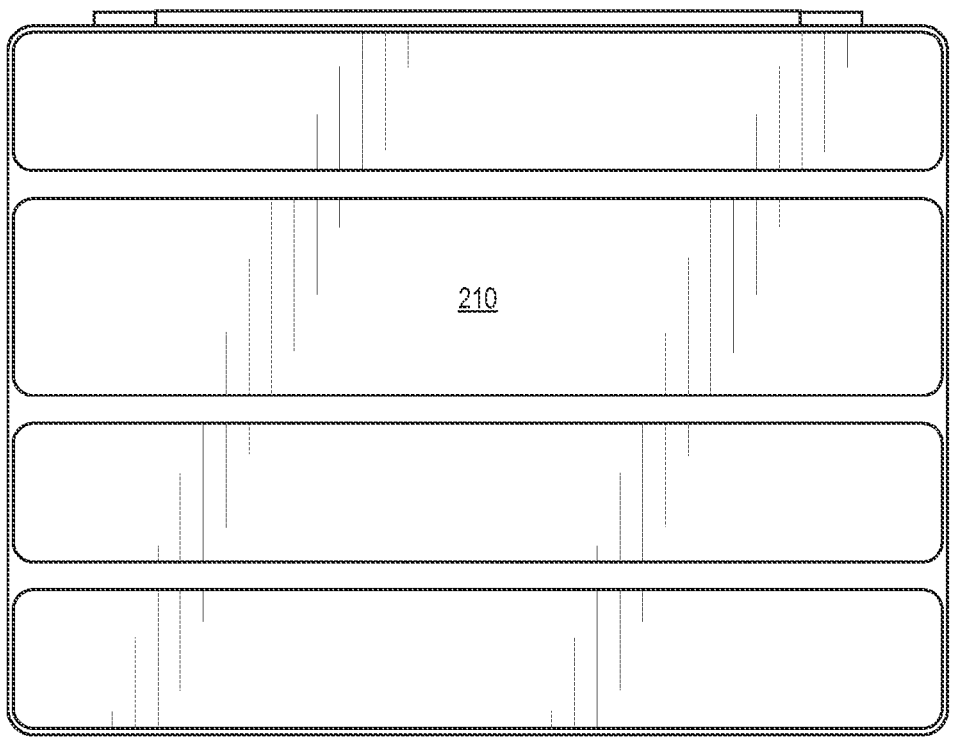

FIG. 2D illustrates that after completing work with a Q&A entry, the user may close the cover 210 to advance to a next entry. If the learning session is based on a non-repetitive display of Q&A entries, the just-processed entry may be excluded from a list of unprocessed items for the current session.

Figure 3A:
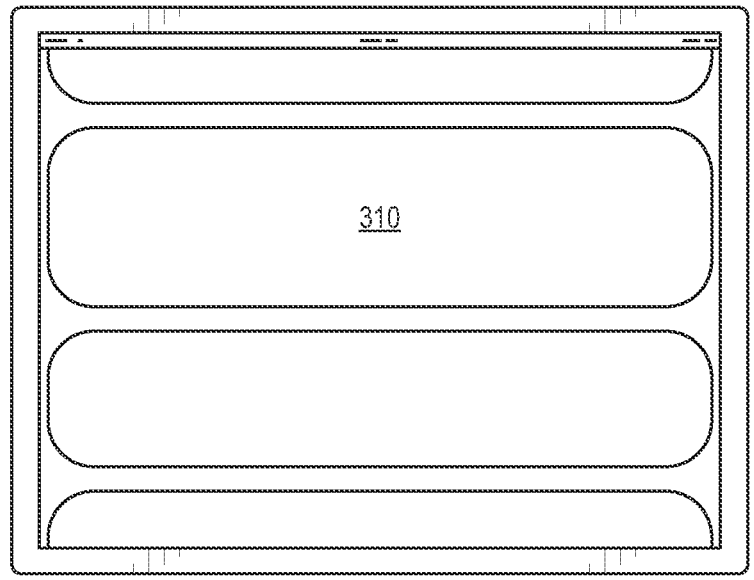
FIGS. 3A-3E a virtual screen cover in different stages according to an embodiment of the system described herein.

FIGS. 3A-3E illustrate another embodiment of the system having a virtual (emulated) screen cover 310. The emulated screen cover 310 is drawn on the computer screen using the computer processor. FIG. 3A shows the virtual cover 310 being completely closed (i.e., covering the entirety of the screen).

Figure 3B:
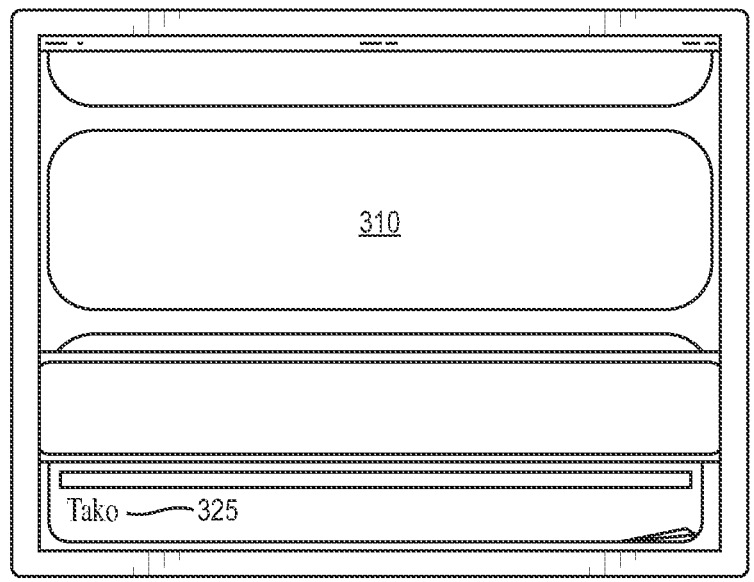
Figure 3C:
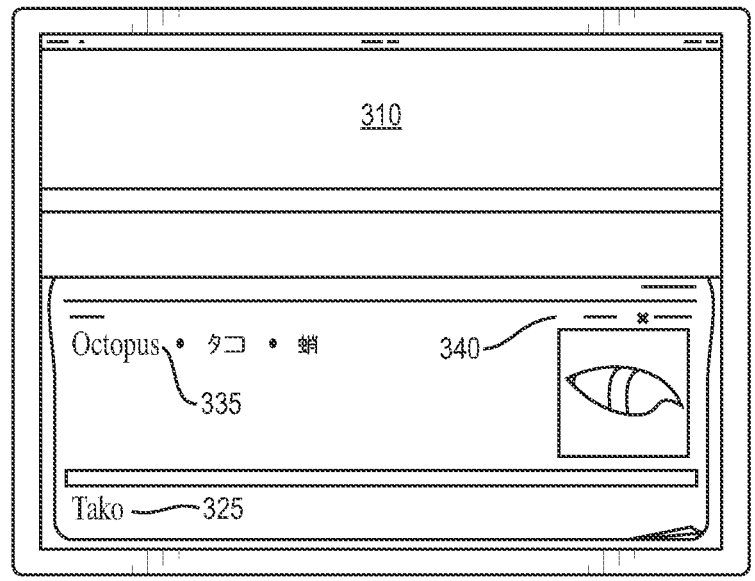

FIG. 3B shows that, by dragging bottom portion of the virtual screen cover 310 up the screen, a user opens a first section of the cover 310, peeks in and is able to see a question 325. Subsequently, as shown in FIG. 3C, the user drags a bottom portion of the already retracted virtual cover 310 further up the screen and can see an answer 335, which may be compared with an anticipated answer. If the user is interested in keeping valid score, a scoring section 340 for an individual Q&A entry can be altered as needed.

Figure 3D:
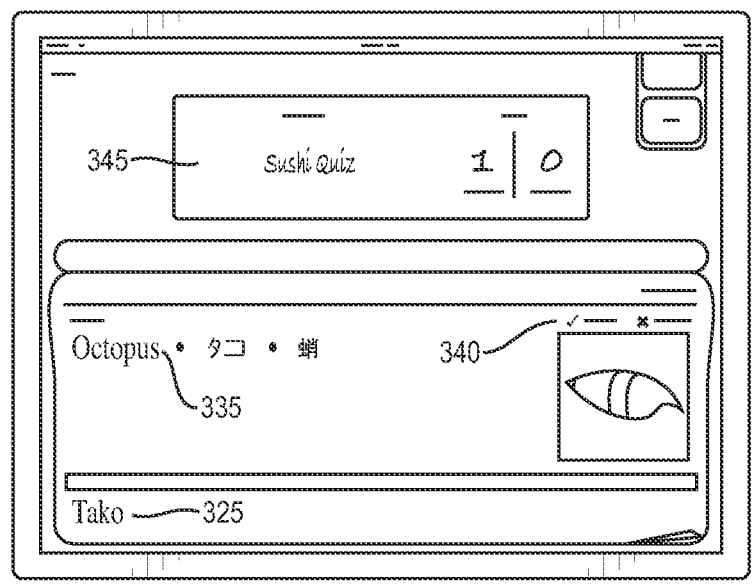
Figure 3E:
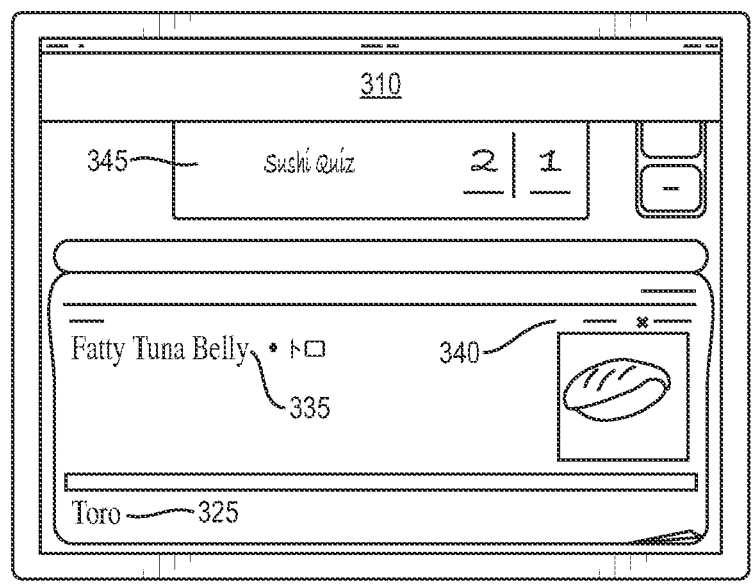

As illustrated in FIG. 3D, the user may open the virtual cover 310 further so that the virtual cover 310 is completely retracted and the entire screen is viewable. The user then may view a total score section 345 located near top of the screen. FIG. 3E shows that when the user is finished with the current Q&A entry, the user may drag down the virtual cover 310 to return the system to a state like that shown in FIG. 3A (described above) and advance to the next Q&A entry.

Figure 4:
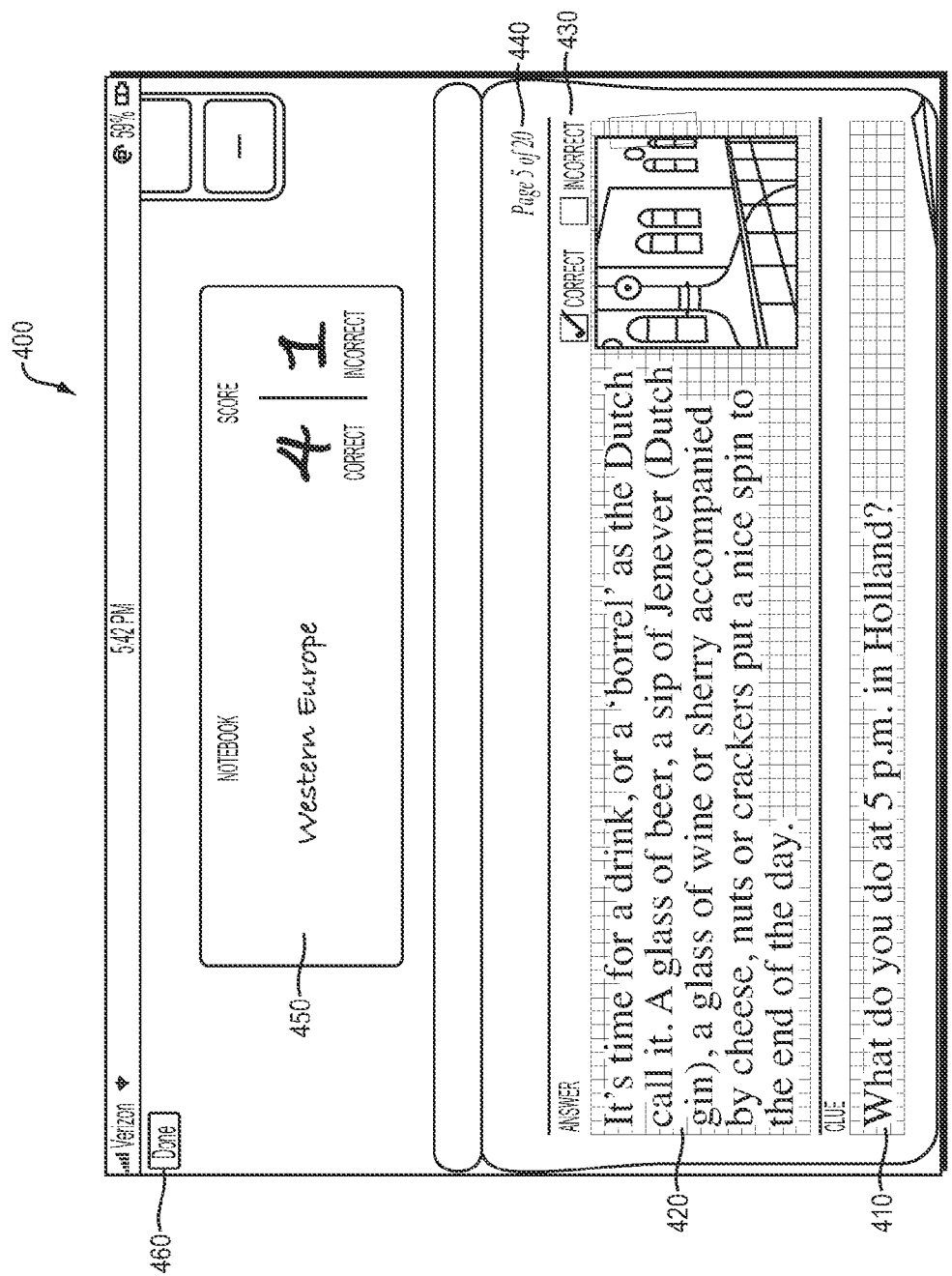
FIG. 4 illustrates a screen layout showing a Q&A item and related elements according to an embodiment of the system described herein.

FIG. 4 is a schematic diagram 400 of an embodiment of screen layout of the system described herein. As discussed elsewhere herein, portions of the screen become incrementally visible to users that open more sections of physical or emulated screen cover. While the diagram 400 exemplifies a specific "three-section" layout, there may be more or less portions possibly with different parts and different arrangements of the parts on the screen. In the diagram, the bottom of the screen includes a question (clue, task conditions) 410 that is visible to a user that peeks in by opening a first section of the cover. An adjacent area of the screen includes an answer (task solution) 420 that may be initially not viewable by the user. The user may spend some time reading and comprehending the question, clue or task 410 before opening the subsequent section of the cover to view the answer 420. In an embodiment herein, the user may guess an answer before viewing the answer 420, thus turning a learning session into a Q&A game.

The user may then take advantage of an area of the screen containing a score section 430 for an individual Q&A entry. The user may select a correct/incorrect answer toggle as necessary. In a different embodiment with a multi-user scenario, where a Q&A learning session is provided for user evaluation and may be monitored, the user may communicate contemplated answer to an administrator (teacher, supervisor, moderator, etc.). In such case, the score section 430 may be updated by the administrator.

Another screen section 440 is provided to give the user current info about the progress of learning session. A total score 450 is provided in another area of the screen that the user accesses by further opening the cover. The user can quit the current learning session by pressing a done button 460. Alternatively, the user may close the physical or virtual cover (as explained elsewhere herein) to progress to the next Q&A entry.

Figure 5:
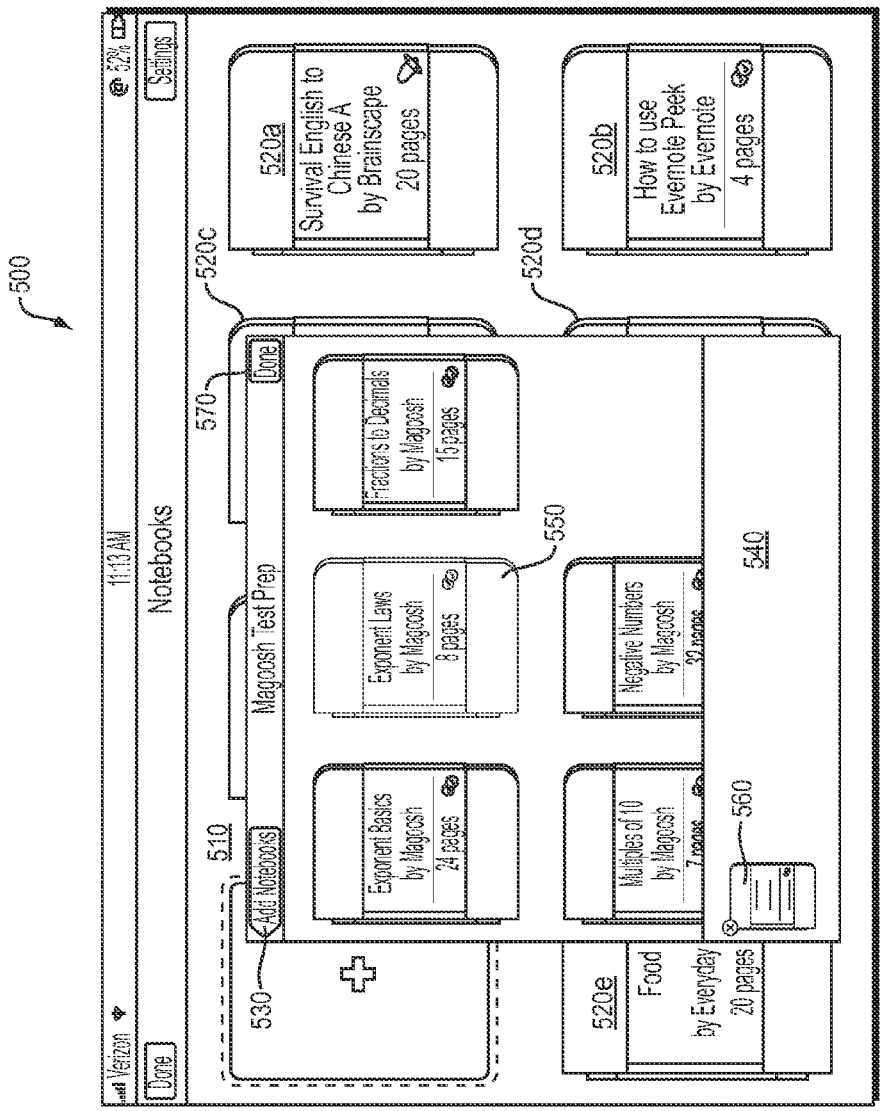
FIG. 5 illustrates organization of sessions as notebooks according to an embodiment of the system described herein.

FIG. 5 is a diagram 500 showing groupings of Q&A entries into various notebooks (questionnaires) by topics, publishers, and collections, or learning series. A scrollable notebook pane 510 carries a set of notebooks 520a-520e currently available to a user. The user can add new notebooks from local or online collections by pressing an "add notebook" button 530. Pressing the button 530 opens a notebook selection panel 540, which offers a collection (series) of notebooks titled (as an example) "Magoosh Test Prep". Upon opening a collection, the user can choose a new notebook 550 to add to the notebook pane 510. In some embodiments, the user may be able to choose multiple notebooks. Thumbnail images of the notebooks 560 may appear at the bottom of the notebook selection panel, while the respective entries appear shaded on the list. After selection of new notebooks is completed, the user closes the notebook selection panel using a button 570.

Figure 6:
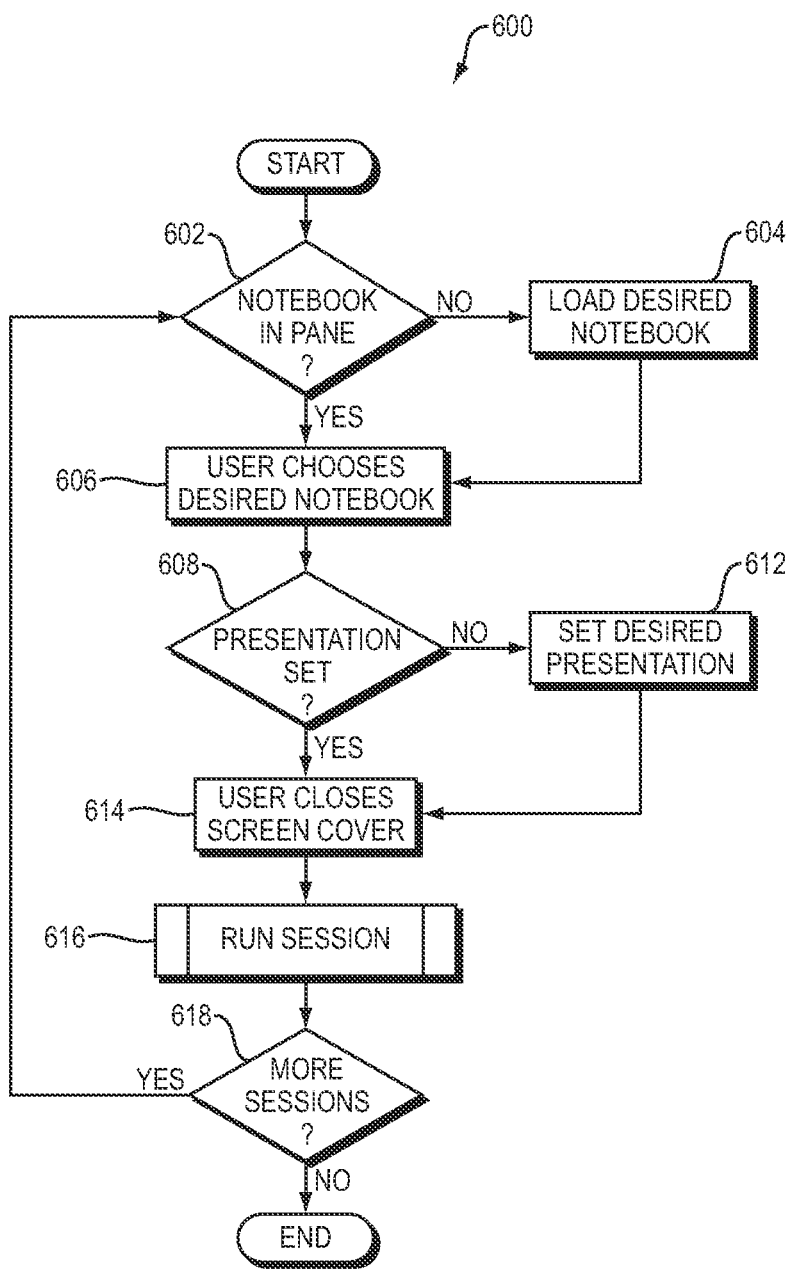
FIG. 6 is a flow diagram illustrating setting up and running a session according to an embodiment of the system described herein.

FIG. 6 is a flow diagram 600 showing processing in connection with learning application controlled by an intelligent screen cover according to an embodiment of the system described herein. Processing begins at a test step 602 where it is determined if the notebook desired by the user is in the pane from which the user selects notebooks. If not, then control passes to a step 604 where the user loads the desired notebook. Using the pane to view notebooks and adding notebooks to the pane are discussed in more detail elsewhere herein.

Following the step 604 or following the step 602 if the desired notebook had been in the pane is a step 606 is a step 606 where the user chooses the desired notebook from the pane. Following the step 606 is a test step 608 where it is determined if the order of presentation of the questions and answers (or tasks, etc.) is set. As discussed elsewhere herein, in some embodiments, the presentation of questions (tasks) may be in a particular order, selected by a user, or some combination of both. In addition, in some embodiments questions (tasks) may be repeated while in other embodiments questions (tasks) are not repeated. If it is determined at the test step 608 that the presentation is not set, then control transfers from the test step 608 to a step 612 where the user sets the desired presentation according (for example) to a non-repetitive random order, a non-repetitive fixed order, a repetitive random or fixed order, etc., as discussed elsewhere herein.

Following the step 612 or following the test step 608 if the presentation had already been set is a step 614 where the user closes the screen cover. Following the step 614 is a step 616 where the user runs the session. Running the session at the step 616 is described in more detail elsewhere herein. Following the step 616 is a test step 618 where it is determined if the user desires to run another session. If not, then processing is complete. Otherwise, control transfers from the test step 618 back to the step 602 to run another session with a (possibly) different notebook.

Figure 7:
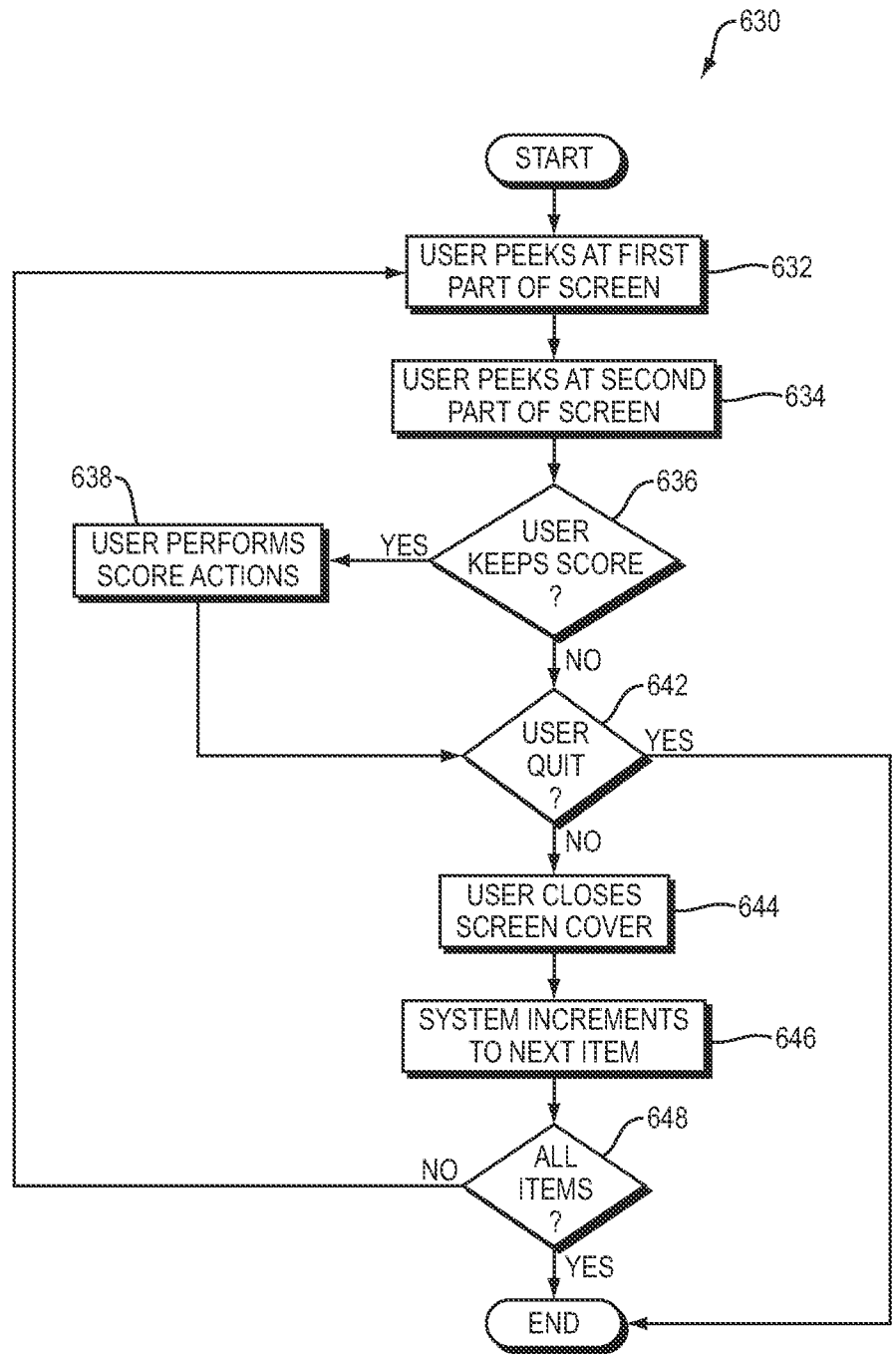
FIG. 7 is a flow diagram illustrating in more detail running a session according to an embodiment of the system described herein.

FIG. 7 is a flow diagram 630 illustrating in more detail the processing performed at the step 616, described above, where the session is run. Processing begins at a first step 632 where the user peeks at a first part of the screen (e.g., to view a question, as described elsewhere herein). Following the step 632 is a step 634 where the user peeks at a second part of the screen (e.g., to view an answer to the question provided at the first part of the screen, as described elsewhere herein). Following the step 634 is a test step 636 where it is determined if the user is keeping score. As discussed elsewhere herein, a user (or another) may keep track of the number of correct and incorrect answers. If it is determined at the test step 636 that the user is keeping score, then control transfers from the step 636 to a step 638 where the user (or another) performs score keeping. As discussed elsewhere herein, scorekeeping may include checking a box indicating a correct or incorrect answer and/or reviewing a different portion of the screen indicating the score.

Following the step 638 or following the step 636 if the user is not keeping score is a test step 642 where it is determined if the user is quitting the session by, for example, pressing the done button 570 discussed above in connection with FIG. 5. If so, then processing is complete. Otherwise, control transfers from the test step 642 to a step 644 where the user closes the screen cover to prepare for the next iteration. Following the step 644 is a step 646 where the system increments to prepare to present the user with the next item (e.g., next question and answer) from the notebook. Following the step 646 is a test step 648 where it is determined if all of the items have already been presented to the user (i.e., the increment at the step 646 could not advance to a new item because all of the items have already been presented to the user. If so, then processing is complete. Otherwise, control transfers from the test step 648 back to the step 632 for another iteration. Note that, in some embodiments, if an option with non-repetitive order of items was chosen by a user, the just viewed entry may be deleted from the list of future entries of the current notebook (or otherwise marked) for the duration of the current learning session, so that the entry does not appear again in the same session.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A computer learning system comprising:
a computer screen;
a physical cover that selectively covers and reveals different amounts of the computer screen;
and a computer processor that senses an amount of the computer screen that is revealed by the cover, the processor causing a first learning segment to be displayed on the computer screen in response to the cover revealing a first portion of the computer screen and causing a second learning segment to be displayed on the computer screen in response to the cover revealing a second portion of the computer screen, wherein the first learning segment is a question and the second learning segment is a correct answer to the question.

2. A computer learning system, according to claim 1, wherein in response to the cover revealing a third portion of the computer screen, the computer processor causes a score to be displayed on the computer screen.

3. A computer learning system, according to claim 2, wherein the first portion of the computer screen is a subset of the second portion of the computer screen and the second portion of the computer screen is a subset of the third portion of the computer screen.

4. A computer learning system, according to claim 1, wherein the computer processor and the computer screen are provided by a tablet computer.

5. A computer learning system, according to claim 4, wherein the cover is a magnetic cover having an edge that includes at least one magnet.

6. A computer learning system, according to claim 5, wherein a location of the edge of the cover is determined by detecting the at least one magnet.

7. A computer learning system, according to claim 1, wherein a location of an edge of the cover is determined based on user touch gestures on the computer screen.

8. A method of providing automated learning, comprising:
sensing an amount of a computer screen that is revealed by a physical cover that is placed on the computer screen;
causing a first learning segment to be displayed on the computer screen in response to the cover revealing a first portion of the computer screen; and
causing a second learning segment to be displayed on the computer screen in response to the cover revealing a second portion of the computer screen, wherein the first learning segment is a question and the second learning segment is a correct answer to the question.

9. A method, according to claim 8, further comprising:
causing a score to be displayed on the computer screen in response to the cover revealing a third portion of the computer screen.

10. A method, according to claim 9, wherein the first portion of the computer screen is a subset of the second portion of the computer screen and the second portion of the computer screen is a subset of the third portion of the computer screen.

11. Computer software provided in a non-transitory computer-readable medium, that provides automated learning, the software comprising:
executable code that senses an amount of a computer screen that is revealed by a physical cover that is placed on the computer screen;
executable code that causes a first learning segment to be displayed on the computer screen in response to the cover revealing a first portion of the computer screen; and
executable code that causes a second learning segment to be displayed on the computer screen in response to the cover revealing a second portion of the computer screen, wherein the first learning segment is a question and the second learning segment is a correct answer to the question.

12. Computer software, according to claim 11, further comprising:
executable code that causes a score to be displayed on the computer screen in response to the cover revealing a third portion of the computer screen.

13. Computer software, according to claim 12, wherein the first portion of the computer screen is a subset of the second portion of the computer screen and the second portion of the computer screen is a subset of the third portion of the computer screen.

14. Computer software, according to claim 11, wherein a location of an edge of the cover is determined based on user touch gestures on the computer screen.

* * * * *